May 29, 1951  T. F. PRATHER  2,554,753
POTATO DIGGER AND CLEANER
Filed May 28, 1947  4 Sheets-Sheet 1

Inventor
Thomas F. Prather
By Clarence A. O'Brien
and Harvey B. Jacobson
Attorneys May 29, 1951

T. F. PRATHER 2,554,753

POTATO DIGGER AND CLEANER

Filed May 28, 1947

Inventor

Thomas F. Prather

By *Clarence A. O'Brien
and Harvey B. Jacobson*
Attorneys

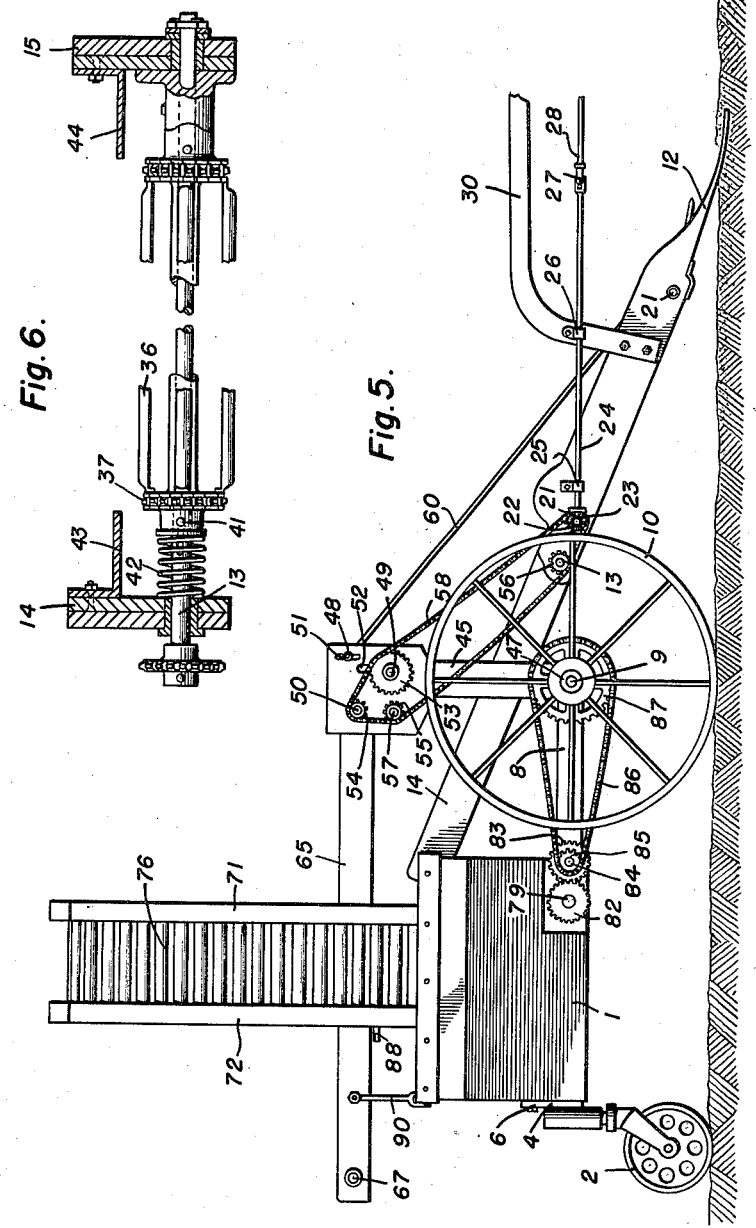

Patented May 29, 1951

2,554,753

UNITED STATES PATENT OFFICE 2,554,753

POTATO DIGGER AND CLEANER

Thomas F. Prather, Wasco, Calif., assignor of one-half to George D. Prather, Wasco, Calif.

Application May 28, 1947, Serial No. 751,098

7 Claims. (Cl. 55—137)

1

This invention relates to improvements in potato diggers.

An object of the invention is to provide an improved tractor drawn and operated potato digger which will dig potatoes from the ground while in motion, separate the dirt and vines therefrom, convey the potatoes to a hopper, and finally convey and drop the potatoes from the hopper into a truck which will be driven beside the potato digger while traveling at approximately the same rate of speed.

Another object of the invention is to provide an improved construction of tractor drawn and operated potato digger which will automatically dig potatoes from the ground while being drawn along the potato rows, depositing the potatoes with the vines and dirt adhering thereto onto an endless conveyor which will deposit them onto an agitating conveyor where the dirt will be separated from the potatoes to drop back onto the ground, during which time the vines will be separated by engagement with suitable adjustable vine cleaning fingers, after which the cleaned potatoes will be dropped into a hopper from which they will be conveyed upwardly by means of an endless loading conveyor to be dropped into the body of a truck which will be driven beside the potato digger at approximately the same rate of speed at which said potato digger is traveling.

A further object of the invention is to provide an improved construction of tractor drawn potato digger and loader which will be operated by a connection with the power take-off on the tractor.

Another object of the invention is to provide an improved form of tractor drawn and operated potato digger and loader which will be highly efficient in operation, and relatively inexpensive to manufacture and produce.

Other objects will appear as the description proceeds.

In the accompanying drawings which form a part of this application,

Figure 5 is a side elevation of the improved potato digger and loader, and

2

Figures 3, 4:
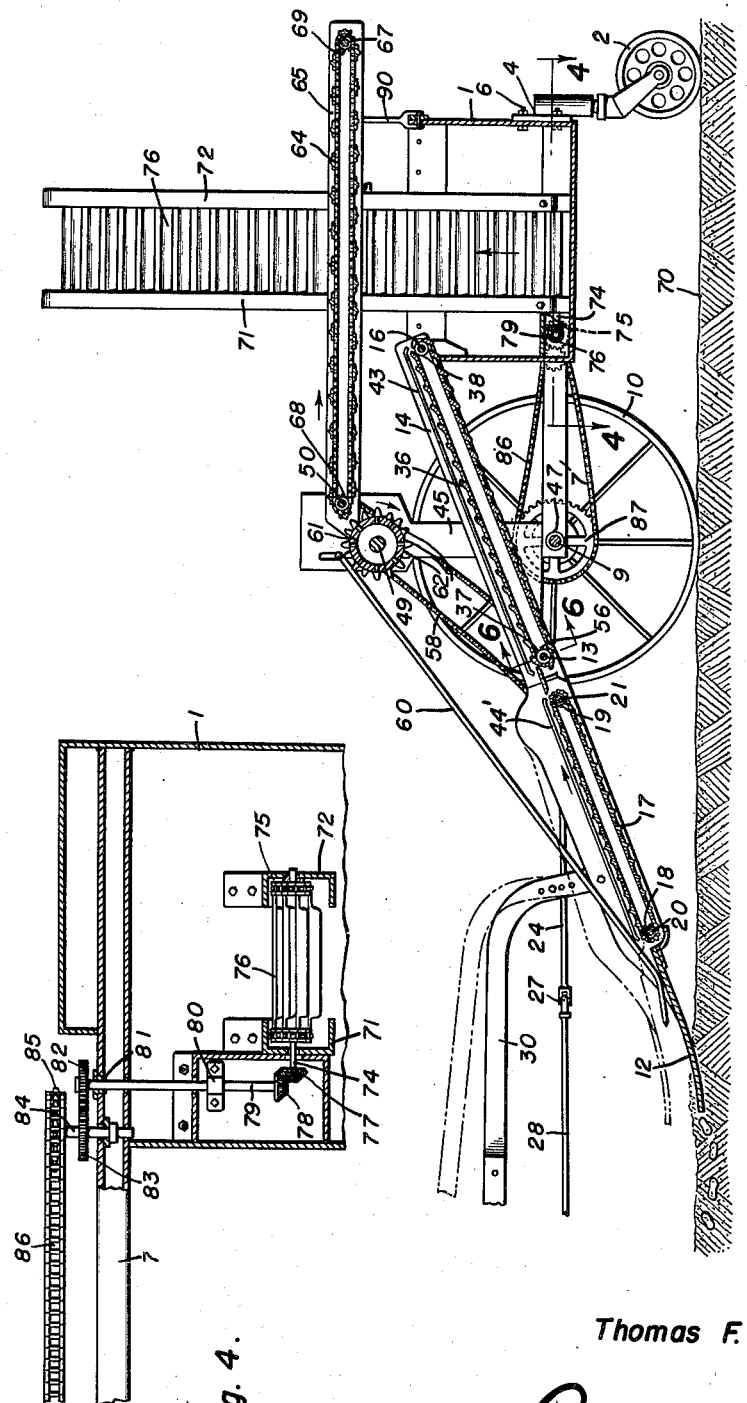
Figure 3 is a partial sectional view taken on the line 3—3 of Figure 2.
Figure 4 is a sectional view taken on the line 4—4 of Figure 3.

Figure 6 is a sectional view taken on the line 6—6 of Figure 3.

Like characters of reference are used throughout the following specification and the accompanying drawings to designate corresponding parts.

In carrying out the invention, there is provided an improved form and construction of potato digger and loader comprising a substantially rectangular body hopper 1 being supported at its rear end by means of the pair of swivel wheels 2 and 3 mounted in the brackets 4 and 5 secured to the rear end of said body hopper 1 by means of the bolts 6. A pair of forwardly extending frame members 7 and 8 are secured to the body hopper 1 at their rear ends, and support the transversely extending axle 9 connected between their forward ends. Supporting wheels 10 and 11 are rotatably mounted upon the outer ends of the axle 9, as clearly illustrated in the several figures of the drawings.

A pointed potato scoop or plow 12 is pivotally and adjustably supported upon the cross shaft 13, mounted between the forward ends of the oppositely disposed side frame members 14 and 15, whose rear ends are pivotally supported upon the cross shaft 16 mounted transversely of the body hopper 1 on the upper edge of the front thereof.

An endless chain and flat conveyor 17 will be disposed within the U-shape body portion of the plow 12 between the sprocket wheels 18 and 19 secured to the front and rear supporting shafts 20 and 21 extending between the side walls of said U-shape plow.

The rear shaft 21 extends laterally of the plow 12, and supports a bevel gear 22, which in turn meshes with a bevel gear 23 on the rear end of the operating shaft 24 mounted for rotation in the laterally extending bearing brackets 25 and 26 attached to the side of the body of said plow 12 and to one of the share bars later to be described. A universal coupling 27 is connected at the front end of the operating shaft 24 and will be connected with a shaft 28 which will be suitably attached to the power take-off connection 29 upon a tractor 100.

The share bars 30 and 31 are secured to the opposite sides of the body of the plow 12 and converge for securing to the plow beam 32, which in turn supports a clevis 33 at its forward end adapted to be connected with the draw bar 34 of the tractor 100, being secured in place by the locking pin 35.

An agitating conveyor 36 is supported between the laterally spaced forwardly projecting side frame members 14 and 15, being supported on the sprockets 37 and 38 secured on the front end rear cross shafts 13 and 16 which are mounted transversely through said side frame members 14 and 15, said shaft 13 being extended beyond the side member 14 and supporting the two sprocket wheels 40 for driving said agitating conveyor.

A sliding pin and slot clutch 41 will be incorporated between the shaft 39 and the sprocket wheel 40, being normally urged to clutched position by means of the coil spring 42, and longitudinally extending guard shields 43 and 44 will extend inwardly from the frame members 14 and 15 to points adjacent the opposite sides of said agitating conveyor 36. Similarly constructed laterally extending shields are provided at the opposite sides of the conveyor 17, one such shield being shown at 44' in Figure 3.

The oppositely disposed vertically extending standards 45 and 46 are supported in contact with the outer surfaces of the forwardly extending frame members 7 and 8, depending below the same and supporting bearings 47 for the axle 9.

The upper ends of said standards 45 and 46 are slightly enlarged to support the three transversely extending cross shafts 48, 49 and 50, said shafts 48 and 49 being adjustably mounted in the slots 51 and 52 for vertical adjustment.

Sprocket wheels 53, 54, and 55 are secured upon the right hand ends of the shafts 49, 50 and 57 respectively extending between the vertical standards 45 and 46 and on the end of the shaft 13, being connected together for simultaneous rotation and operation by means of the sprocket chain 58, said chain 58 also extending about the sprocket wheel 59 on the cross shaft 21, thus being operated from the driving shafts 24 and 28 connected with the tractor power take-off 29.

Figure 1:
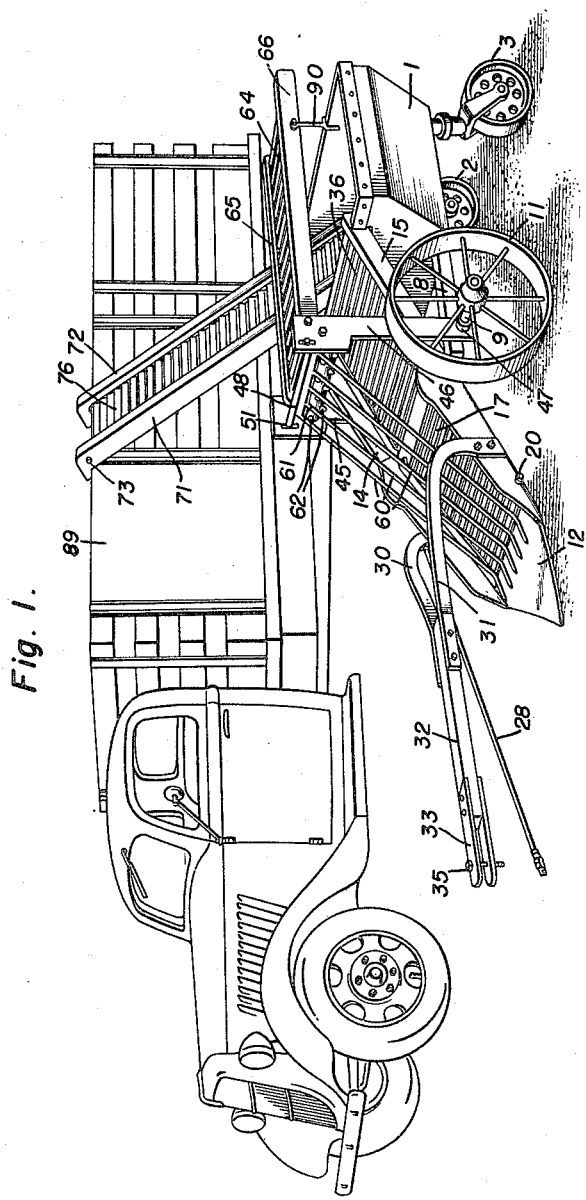
Figure 1 is a perspective view of the improved potato digger and loader showing the same beside a motor truck in position for loading potatoes into the truck.
Figure 2:
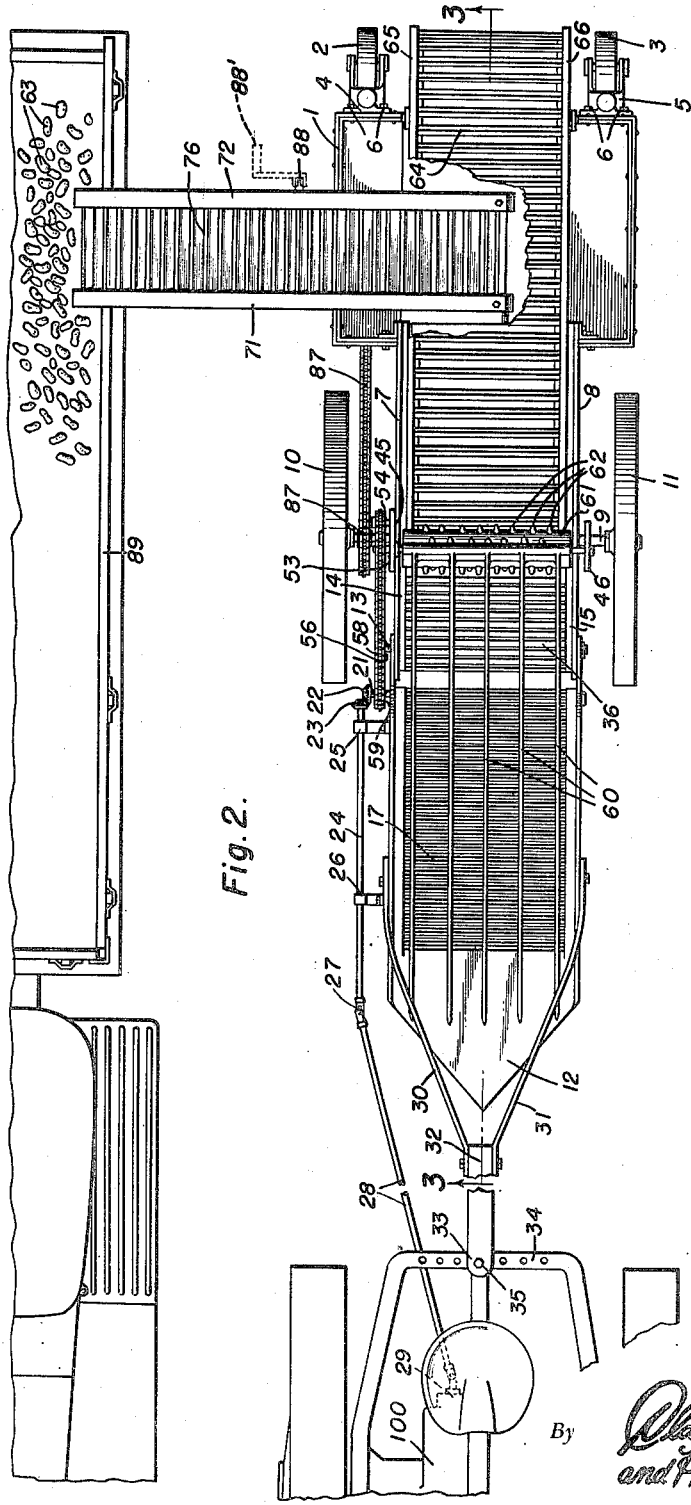
Figure 2 is a plan view of the potato digger showing a tractor attached thereto and a motor truck disposed beside the same in position to be loaded.

A plurality of parallel forwardly extending vine stripping fingers 60 are secured to or formed integrally with the cross shaft 48, while a large rubber roller 61 having spaced protuberances 62 on its outer surface is rotatably mounted for rotation with the cross shaft 49, as clearly illustrated in Figure 1 of the drawings. The stripping fingers 60 will extend to the forward and lower end of the endless conveyor 17 and a slight distance forwardly thereof, being bent upwardly at their forward extremities to engage potato vines (not shown) as the potatoes 63 are dug or plowed up by the plow 12. As the potatoes are conveyed upwardly and rearwardly, the vines will be stripped therefrom, the rubber roller with the protuberances 61 preventing the piling up or collecting of the vines at the forward end of the vine conveyor 64 which is driven by the sprocket wheel 54 on the forward shaft 50 of said conveyor. The conveyor 64 includes parallel side members 65 and 66 and a rear cross shaft 67. Sprocket wheels 68 and 69 are secured to the shafts 50 and 67 for supporting the chain conveyor 64, whereby the stripped vines will be carried to and beyond the rear of the body hopper 1 and dumped upon the ground 70.

A loading conveyor will be positioned in the body hopper 1, and will include two parallel vertically extending inclined side rails 71 and 72, between which the upper and lower shafts 73 and 74 will be mounted. A conveyor chain belt 76 is arranged thereon and is supported for movement by suitable sprocket wheels 75, as illustrated in Figure 4, and positioned on the shafts 73 and 74.

A bevel gear 77 will be secured to the end of the shaft 74, and will mesh with a bevel gear 78 upon the short shaft 79 mounted in the bearings 80 and 81. The outer end of the shaft 79 will support the gear 82 which will mesh with a gear 83 upon the stub shaft 84 supported upon the frame member 7. The sprocket wheel 85 will be mounted upon said stub shaft 84 and will be connected by the sprocket chain 86 to the large sprocket wheel 87 secured to the axle 9.

If desired, an elevating mechanism for the loading conveyor 76 will be provided. For this purpose a shaft 88 is provided having cooperating gear and rack mechanism of the conventional type, not shown, which is suitably actuated by means of a crank 88', and removably positioned on the outer end of the shaft 88. A suitable clutch mechanism may be provided when desirable to discontinue the operation of the loading conveyor 76 while the plow is being pulled along a potato row and an empty truck is taking the place alongside of the plow after a truck has just been filled and has left for the place where the potatoes will be stored.

It will be understood that a tractor will be used to pull and operate the plow, and that a motor truck 89 will operate beside the plow at approximately the same rate of speed, so that the dug and cleaned potatoes loaded into the body hopper of the plow, may be loaded by the loading conveyor 76 into the truck 89.

Depending forked braces 90 will be secured between the vine conveyor side rails 65 and 66 and the upper edge of the rear end of the body hopper 1 to firmly support the conveyor in operative position.

The mode of operation of the improved tractor drawn and operated potato plow will now be described. Assuming that a tractor 100 is attached by means of the clevis 73 to the beam 32 used for pulling the plow, and that the plow is adjusted to the proper depth for plowing out potatoes and is being pulled along the potato rows, the dug potatoes and vines will be plowed onto the forward end of the conveyor 17 disposed within the U-shape plow body, with the vines of the potatoes being engaged by the spaced forwardly extending vine cleaning fingers 60. As the potatoes reach the upper end of said conveyor 17, they will be transferred to the agitating conveyor 36 and will be agitated so that all extraneous dirt will be knocked therefrom to fall back upon the ground, and the vines from the potatoes will be pulled loose by the protuberances 62 upon the rubber roll 61, and the loosened vines will pass up onto the vine conveyor 64 to be discharged at the rear end thereof at a point behind the potato digger, said cleaned potatoes dropping into the body hopper 1. The potatoes in the body hopper 1 will be removed by the loading conveyor 76 and elevated upwardly on the same to be discharged over the upper end thereof into the body of the motor truck 89 which will be moving beside the potato digger at approximately the same rate of speed.

From the foregoing description, it will be apparent that there has been devised and provided a highly efficient form of tractor drawn and operated potato digger which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A tractor drawn and operated potato digger including a wheel supported body hopper, forwardly extending frame members supported thereby, a potato scoop plow supported between the forward ends of said frame members, an endless conveyor disposed within said scoop plow, an agitating conveyor disposed between said hopper body and the forward ends of said frame members, adjustably secured vine stripping fingers overlying said plow and agitating conveyor, means disposed at the rear of the fingers and overlying the hopper for carrying vines beyond the rear of the hopper means for pulling said potato digger and for operating said conveyors, and means comprising a roller disposed between said vine stripping fingers and said vine carrying means for engaging said vines and urging the same onto said vine carrying means.

2. A tractor drawn and operated potato digger including a wheel supported body hopper, forwardly extending frame members supported thereby, a potato scoop plow supported between the forward ends of said frame members, an endless conveyor disposed within said scoop plow, an agitating conveyor disposed between said body hopper and the forward ends of said frame members, vine stripping fingers overlying said plow and agitating conveyor, a vine stripping roller formed with enlarged protuberances on its outer surface rotatably mounted adjacent the upper end of said vine stripping fingers, and means for pulling said potato digger and for operating said conveyors.

3. A tractor drawn and operated potato digger including a wheel supported body hopper, forwardly extending frame members supported thereby, a potato scoop plow supported between the forward ends of said frame members, an endless conveyor disposed within said scoop plow, an agitating conveyor disposed between said body hopper and the forward ends of said frame members, vine stripping fingers overlying said plow and agitating conveyor, a vine stripping roller formed with enlarged protuberances on its outer surface rotatably mounted adjacent the upper end of said vine stripping fingers, an endless conveyor disposed to the rear of said vine stripping roller for carrying and depositing vines to the rear of said body hopper, and means for pulling said potato digger and for operating said conveyors.

4. The subject matter as claimed in claim 3, and an endless loading conveyor disposed in said body hopper for removing potatoes deposited therein.

5. The subject matter as claimed in claim 3, an endless loading conveyor disposed in said body hopper for removing potatoes deposited therein, and means connected with the power take-off from the potato digger pulling means for operating all of said conveyors.

6. The subject matter as claimed in claim 3, an endless loading conveyor disposed in said body hopper for removing potatoes deposited therein, and means for vertically adjusting said vine stripping fingers and roller.

7. A tractor drawn and operated potato digger adapted to cooperate with a movable storage means, a movably supported open top hopper, a scoop plow extending forwardly thereof, an endless conveyor disposed within said scoop plow, an agitating conveyor disposed between said first conveyor and hopper, vine stripping fingers adjustably secured adjacent said hopper and overlying said first conveyor and agitating conveyor, a vine stripping roller rotatably mounted adjacent the rear ends of said fingers, means disposed adjacent said roller and extending over the hopper for receiving vines from the fingers and roller and conveying them beyond the hopper and means for pulling said hopper and for operating said conveyors.

THOMAS F. PRATHER.

REFERENCES CITED

The following references are of record in the file of this patent:

UNITED STATES PATENTS

| Number | Name | Date |
|---|---|---|
| 420,573 | Fellows | Feb. 4, 1890 |
| 494,684 | Nicholson | Apr. 4, 1893 |
| 685,908 | Colgrove | Nov. 5, 1901 |
| 1,443,741 | Heath | Jan. 30, 1923 |
| 1,715,218 | Wright | May 28, 1929 |
| 2,294,252 | Sapulla | Aug. 25, 1942 |